Sept. 17, 1968

J. J. TRUDEAU 3,401,740

GAS TURBINE REGENERATOR SEAL

Filed March 22, 1967

INVENTOR
JOHN J. TRUDEAU

BY John R. Faulkner
Glenn S. Lundsen

ATTORNEYS

Sept. 17, 1968  J. J. TRUDEAU  3,401,740
GAS TURBINE REGENERATOR SEAL
Filed March 22, 1967  2 Sheets-Sheet 2

JOHN J. TRUDEAU
INVENTOR

BY John R. Faulkner
Glenn S. Needer
ATTORNEYS

United States Patent Office 3,401,740
Patented Sept. 17, 1968

3,401,740
GAS TURBINE REGENERATOR SEAL
John J. Trudeau, Detroit, Mich., assignor to Ford Motor Company, Dearborn, Mich., a corporation of Delaware
Filed Mar. 22, 1967, Ser. No. 625,138
6 Claims. (Cl. 165—7)

ABSTRACT OF THE DISCLOSURE

A D-shaped flexible metal leaf is subjected to an air pressure differential that moves the leaf into a sealing arrangement between the housing and a nonrotating shoe of a gas turbine engine where the leaf seals both the periphery and a diameter of the shoe. Two of the leaves can be located in a retainer having a U-shaped cross section with one leaf sealing between the housing and the retainer and the second leaf sealing between the retainer and the shoe. Cooling air is conducted along the straight portions of the leaves and the heat removed thereby is recovered by the regenerator. Three identical D-shaped assemblies of leaves and retainers seal the entire regenerator.

Summary of the invention

Regenerators for gas turbine engines and the housing enclosing the regenerator distort considerably because of the differences in temperature between the heated and cooled portions of the regenerator. Various sealing arrangements have been used to improve sealing around the regenerator including the use of circumferential leaf-type seals having wear rings to compensate for relative movement between either the regenerator and the seal or the seal and the housing. These circumferential seals could not be used to seal a diameter or chord of the regenerator so it was necessary to use additional seals across the diameter or chord.

Excellent sealing, even at low pressure differentials, and the ability to seal a chord or diameter in addition to the periphery of the regenerator, is provided by the seal of this invention. The seal is useful in gas turbine regenerators having a regenerator rotating in a housing with sectors of the regenerator being subjected to air streams of different pressures. A shoe that is stationary with respect to the housing surrounds one of the sectors and is in a sliding arrangement with the regenerator. A flexible metal leaf positioned between the shoe and the housing is subjected to a high pressure air stream at one side which moves the leaf into a sealing arrangement with the shoe and the housing.

Detailed description

Figure 1:
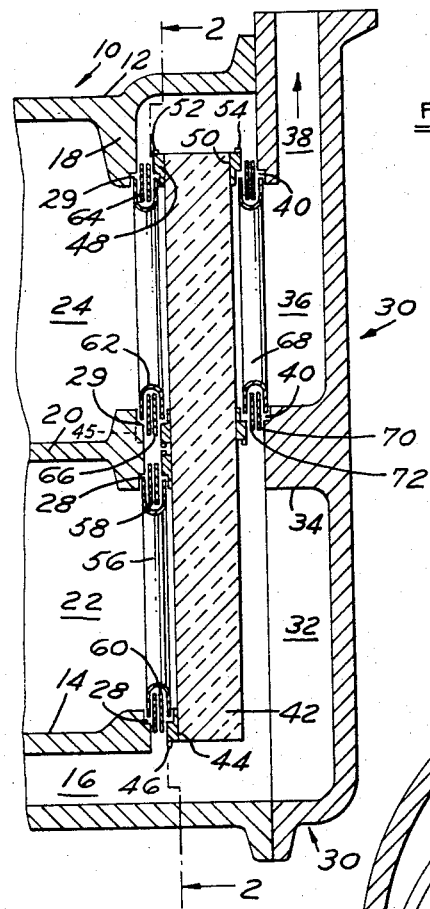
FIGURE 1 is a partial sectional view through a gas turbine engine showing a regenerator with three D-shaped seal assemblies of this invention in place.
Figure 2:
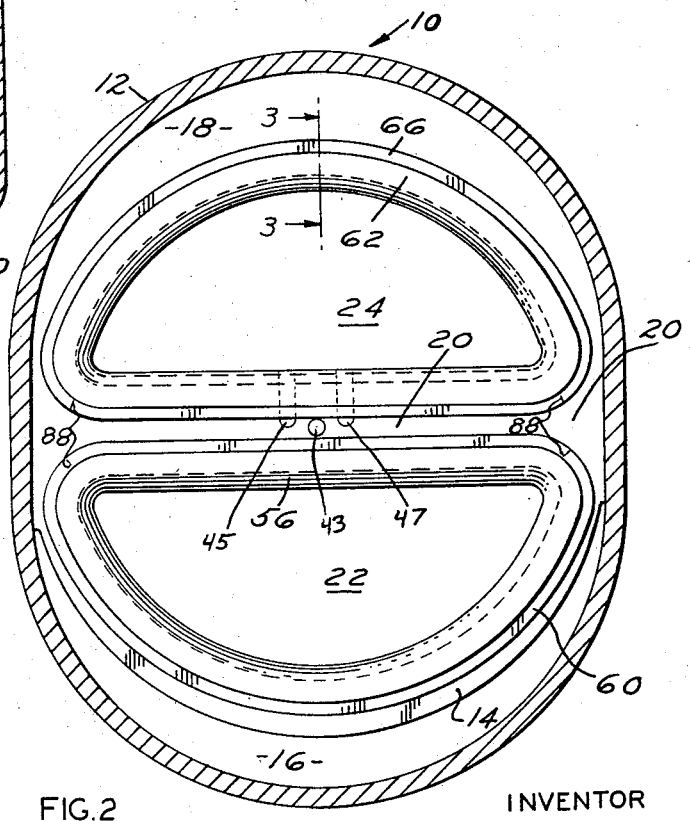
FIGURE 2 is a top view of the engine taken along line 2—2 showing the D shape of the two inner seals and their arrangement in sealing both the inner periphery and diameter of the regenerator.

Referring to FIGURE 1, the housing indicated generally by the numeral 10 of a gas turbine engine comprises an outer wall 12. Spaced a short distance from the lower part of outer wall 12 is an inner wall 14 that terminates a short distance from the end of outer wall 12. Inner wall 14 intersects the outer wall 12 as shown in FIGURE 2 and forms an inlet passage 16 therewith.

A shelf 18 located a short distance from the end of outer wall 12 projects inwardly therefrom. A diametrical wall 20 passes through housing 10 equally spaced between inner wall 14 and the lip of shelf 18, thereby dividing the remaining interior of housing 10 into two semicircular passages 22 and 24. The end of wall 20 lies in the plane of the top of wall 14 and shelf 18. A ledge 28 facing passage 22 is formed around the top portion of walls 14 and 20, and a similar ledge 29 facing passage 24 is formed around the top portion of wall 20 and shelf 18.

A cap 30 is fastened to housing 10 by conventional means (not shown) and comprises a chamber 32 communicating with passage 16 and extending over passage 22. A diametrical wall 34 formed on the plane of wall 20 separates chamber 32 from a chamber 36 formed over passage 24 and communicating with an outlet passage 38. A ledge 40 is formed in cap 30 around the opening to chamber 36.

A ceramic or metal regenerator 42 is mounted rotatably on a spindle 43 (FIGURE 2) attached to the top of wall 20 and is driven by appropriate means such as gearing (not shown) attached to its periphery. A shoe 44 located between regenerator 42 and walls 14 and 20 surrounds passage 22 and is restrained from rotation by ears 46 on its outer surface engaging housing 10. Regenerator 42 slides on shoe 44 which has a specially treated surface to reduce the wear of regenerator 42. A similar shoe 48 is located between regenerator 42 and wall 20 and shelf 18 where it surrounds passage 24, and a third shoe 50 is located between regenerator 42 and cap 30 where it surrounds the opening to chamber 36. Appropriate ears 52 and 54 engage housing 10 and cap 30 to prevent rotation of shoes 48 and 50, respectively, with regenerator 42.

A retainer 56 having a U-shaped cross section with the opening facing outward (see FIGURES 1 and 3) is positioned loosely between shoe 44 and ledge 28. Two metal leaves 58 and 60 have ends located in the retainer opening and extend out of the retainer with leaf 58 positioned adjacent the top of walls 14 and 20 and leaf 60 positioned adjacent shoe 44. Similarly, a retainer 62 having leaves 64 and 66 is positioned between shoe 48 and ledge 29 where it surrounds passage 24 and a retainer 68 having leaves 70 and 72 is positioned between shoe 50 and ledge 40 where it surrounds the opening to chamber 36.

The shoes, retainers, and leaves are D-shaped as shown in FIGURE 2 with regenerator 42 sliding on the shoes, the retainers loosely positioned between the appropriate shoes and ledges, and the leaves loosely positioned within the appropriate retainer. Shallow slots 45 and 47 are formed on each side of spindle 43 and pass under leaf 64 into passage 24 (see FIGURE 1 also). When the gas turbine engine is operating, high pressure air from the compressor and diffuser passes through passage 16 into chamber which directs the air through the sector of regenerator 42 subtended by passage 22. The air continues through passage 22 to the gas turbine burner and turbine wheels (not shown). Passage 24 then conducts the air from the turbine wheels through the sector of regenerator 42 subtended thereby into chamber 36 and out of passage 38. The pressure in passage 16 is transmitted into chamber 32, around the periphery of regenerator 42 and into the space between retainers 56 and 62 so it surrounds each of the leaf-retainer assemblies.

Pressure drops of 1 p.s.i. or less exist between passage 16 and passage 22 while a pressure drop of about 45 p.s.i. exists between passage 16 and passage 24, and a pressure drop of about 46 p.s.i. exists between passage 16 and chamber 36. These pressure differentials act on the appropriate leaves to force leaves 58 and 60 into sealing contact with walls 14 and 20 and shoe 44 while also forcing leaves 64 and 66 into sealing contact with shelf 18 and wall 20 and shoe 48, and forcing leaves 70 and 72 into sealing contact with cap 30 and shoe 50. If one or both of the leaves are in a rest position away from the sealing surfaces when the engine is started, the pressure drop caused by the leaking air draws the leaf or leaves onto its sealing surface. Slots 45 and 47 conduct small amounts of cooling air from passage 16 along the straight portions of leaves 58, 60, 64 and 66 into passage 24. This cooling air does not decrease the efficiency of the regenerator significantly since the heat is recovered by the regenerator operation.

Figure 4:
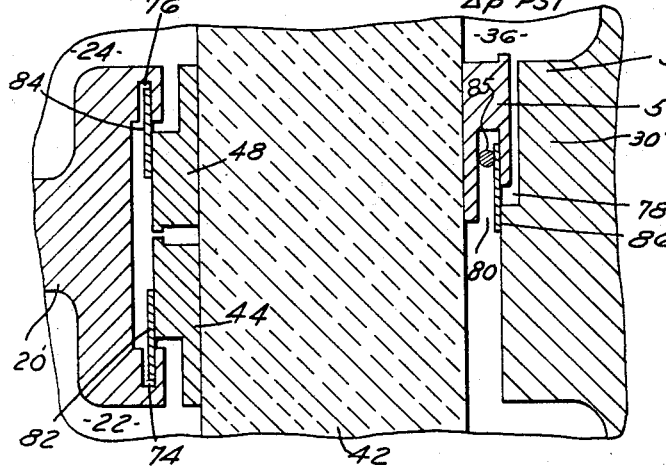
FIGURE 4 is a partial sectional view similar to FIGURE 1 but using a single leaf located in slots in the housing to provide the sealing around each passage.

Turning now to the embodiment of FIGURE 4, a center wall 20′ has two inwardly facing grooves 74 and 76 at each side of its top. Groove 74 runs all the way around the opening to passage 22 and groove 76 runs all the way around the opening to passage 24. A ledge 78 is formed on the side of wall 34′ facing chamber 36 and passes completely around chamber 36. A shoe 50′ positioned between regenerator 42 and cap 30′ has an outwardly facing groove 80 passing completely around the shoe.

A metal leaf 82 is positioned in groove 74 and extends out of groove 74 a short distance to overlap shoe 44. Similarly, a metal leaf 84 positioned in groove 76 extends outwardly therefrom to overlap shoe 48, and a leaf 86 positioned in groove 80 extends outwardly therefrom to overlap wall 34′. During engine operation, the high pressure air from passage 16 urges leaf 82 into sealing contact with shoe 44 and the right side of groove 74 while also urging leaf 84 into sealing contact with shoe 48 and the right side of groove 76 and leaf 86 into sealing contact with the right side of groove 80 and wall 34′. As shown by the differences between seal assemblies on the left and right sides of the regenerator in FIGURE 4, the grooves for the leaf can be formed in either the shoe or the housing. A circular wire positioned in the groove on the pressure side of the leaf as illustrated by wire 85 in groove 80 (FIGURE 4) improves the ability of the leaf to seal at a low differential pressure.

Figure 3:
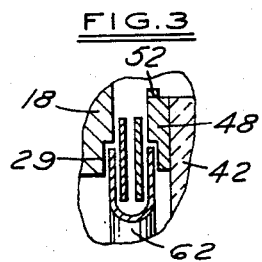
FIGURE 3 is a sectional view taken along line 3—3 of FIGURE 2 showing two sealing leaves in a retainer.
Figure 5:
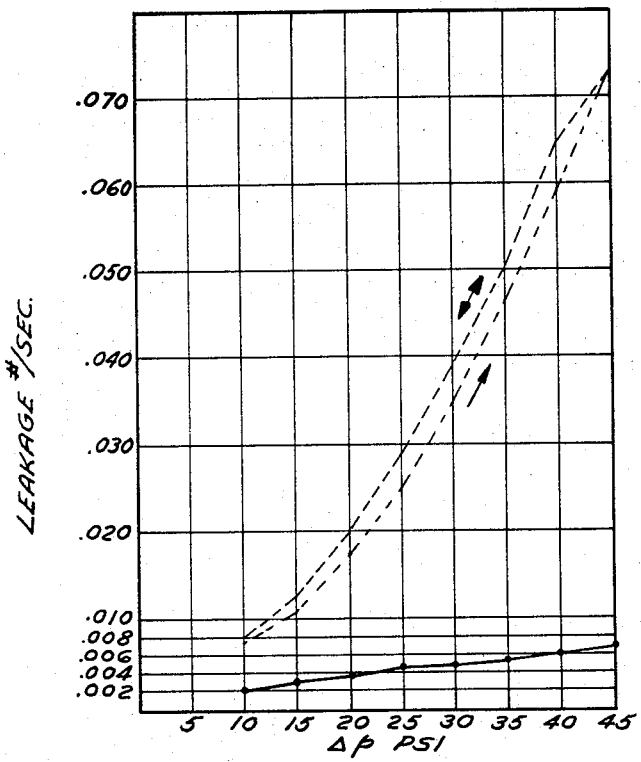
FIGURE 5 is a graph comparing the leakage of a seal of this invention (represented by the solid line) with a conventional prior art seal (represented by a broken line)
Figure 6:
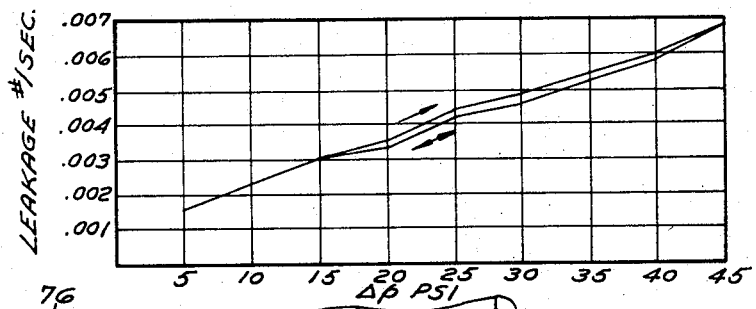
FIGURE 6 is an expanded view of the curve for the seal of this invention shown in FIGURE 5 showing the seating ability of the seal of this invention.

FIGURE 5 compares the leakage of the seal shown in the embodiment of FIGURES 1, 2 and 3 represented by the solid line with a prior art seal represented by the broken lines. Leakage with the seal of this invention ranges from about 25 percent of the prior art seal at a pressure drop of 10 p.s.i. to less than 10 percent at 45 p.s.i. FIGURE 6 is an expanded version of the curve of the seal of this invention shown in FIGURE 5 to show the seating characteristics of the seal. In both figures, the unidirectional arrows show the direction of the pressure change on the first pressure cycle. The prior art seal operates on the lower curve during the first pressure rise and then operates on the upper curve during subsequent pressure cycling, so it has greater leakage during actual engine operation. On the other hand, the seal of this invention seats on its sealing surfaces during the first pressure cycle and thereafter operates with reduced leakage.

Thus, this invention provides a sealing means for the regenerator of a gas turbine engine that has greatly reduced leakage and is easy to mass produce and assemble. Short slits in the corners of the leaves as represented by numeral 88 in FIGURE 2 improve the ability of the leaves to conform to the appropriate sealing surfaces. The sealing arrangement increases the life of the regenerator core and compensates for variations in the thermal expansion of the regenerator. Slots 45 and 47 can be varied in size to control the amount of cooling air along the straight portions of the leaves and can communicate with passage 22 instead of passage 24. Where relatively large amounts of cooling air pass through the slots, engine efficiency is increased by passing the air into passage 22 so the air passes through the power generating equipment of the engine before its heat is recovered by the regenerator.

What is claimed is:
1. In a gas turbine engine having a regenerator rotating in a housing with sectors of said regenerator being subjected to air streams of different pressures, a sealing means for said regenerator comprising:
   a shoe surrounding one of said sectors and sliding on said regenerator, said shoe being stationary with respect to said housing,
   a retainer having a U-shaped cross section extending around said sector with the open portion of the U-shaped cross section facing radially outward, said retainer being loosely mounted relative to said housing and said shoe, and
   two flexible metal leaves positioned loosely in said retainer, one of said leaves having a sealing arrangement with said housing and said retainer and the other having a sealing arrangement with said retainer and said shoe when said leaves are subjected to a pressure differential.
2. The engine of claim 1 in which the shoe and leaf are D-shaped to surround a semicircular sector of the regenerator.
3. The engine of claim 2 comprising means for passing cooling air along the straight portion of the leaves, the heat removed from said leaves being recovered by the regenerator.
4. The engine of claim 3 in which the leaves have short slits in the corners to improve the ability of the leaves to conform to the sealing surfaces.
5. In a gas turbine engine having a regenerator rotating in a housing with sectors of said regenerator being subjected to air streams of different pressures, a sealing means for said regenerator comprising:
   a shoe surrounding one of said sectors and sliding on said regenerator, said shoe being stationary with respect to said housing,
   a flexible metal leaf positioned between said shoe and said housing, said leaf being subjected to a high pressure air stream at one side that moves the leaf into a sealing arrangement with said shoe and said housing, said shoe and leaf being D-shaped to surround a semicircular sector of the regenerator, and
   means for passing cooling air along the straight portion of the leaf, the heat removed from said leaf being recovered by said regenerator.
6. The engine of claim 5 in which the leaf has short slits in its corners to improve the ability of the leaf to conform to the sealing surfaces.

References Cited

UNITED STATES PATENTS

| | | | |
|---|---|---|---|
| 3,234,999 | 2/1966 | Atwood | 165—9 |
| 2,740,614 | 4/1956 | Hammond et al. | 165—9 |
| 2,880,972 | 4/1959 | Williams | 165—9 |
| 3,185,208 | 5/1965 | Chute | 165—9 |
| 3,204,969 | 9/1965 | Williams | 165—9 X |
| 3,311,162 | 3/1967 | Chapman et al. | 165—9 |

ROBERT A. O'LEARY, *Primary Examiner.*

A. W. DAVIS, *Assistant Examiner.*